Patented Jan. 30, 1945

2,368,463

UNITED STATES PATENT OFFICE 2,368,463

PHOTOGRAPHIC MATERIAL AND PROCESSES FOR TREATING SAME

Béla Gáspár, Hollywood, Calif., assignor to Chromogen, Incorporated, a corporation of Nevada No Drawing. Application July 29, 1940, Serial No. 348,296. In Great Britain July 28, 1939

13 Claims. (Cl. 95—6)

(Granted under the provisions of sec. 14, act of March 2, 1927; 357 O. G. 5)

The present invention relates to a photographic material and to a process for the manufacture of color images therewith.

In prior patents the inventor has described photographic materials for color photographic purposes which contain azo dye-forming substances and which may be used for the preparation of color images, various processes being applicable for building up the color image.

The light-sensitive photographic material according to the present invention comprises azo dye-forming substances, which, on the one hand, contain a diazo group or a group capable of being converted into a diazo group such as, for instance, an amino group, a nitro group or a nitroso group, and which, on the other hand, contain a coupling group such as, for instance, a hydroxy group or a reactive methylene group capable of coupling with a diazo group to form an azo dye.

The invention is further directed to a process for producing dyed colloids and photographic images which comprises the building up of an azo dye from an azo dye-forming substance of the above defined character, the azo dye synthesis being effected by causing the diazotized dye-forming substance to couple with itself.

The azo dye components may be incorporated in the photographic material in a known manner, for example, by adding them to the solutions or emulsions used for the preparation of the photographic material or by bathing them into the coated layers.

The conversion of the azo dye-forming substance into an azo dye is preferably carried out by treating the layer or layers containing the azo dye component with a weakly alkaline solution to cause the dye component to combine with itself to form a dye. In the case of dye components which do not contain a diazo group but a group capable of being converted into a diazo group, the conversion of such a group into a diazo group is carried out before the coupling reaction.

The conversion into the diazo compound can be carried out at the image or non-image portions or completely throughout the layer. The diazo group may also be destroyed at the image or non-image portions prior to coupling.

In the case of a photographic material already containing a diazo compound, the azo dye is formed uniformly throughout the layer in the exposed photographic material on development with the usual alkaline developers without the necessity of special processing of the material or by bathing in an alkaline bath prior to the development. In the case of a photographic material containing azo dye components with groups capable of being converted into diazo groups, the exposed and developed material is first treated to convert such groups into diazo groups, for example, by diazotizing an amino group or by reduction of a nitro or nitroso group and diazotation of the amino group thus formed, and the diazo compound is then caused to combine with itself by producing a neutral or weakly alkaline reaction within the treating bath. From the diffusely dyed layers obtained in the above described process, dye-images may be obtained by locally destroying at the image or non-image parts the azo dyes formed. For this purpose, for example, the process described in my United States Letters Patent 2,020,775, granted November 17, 1935, may be employed.

A further method of carrying out the process of the present invention consists in the reduction of the dye component at the image or non-image parts in an image-like fashion, for instance, according to the processes described in my British Patents Nos. 416,660 and 503,873, and thereafter forming a dye-image by causing the remaining dye component to combine with itself, as described above.

For carrying out the process a light-sensitive multi-layer material is especially useful, which comprises a blue-sensitive silver halide emulsion layer, a green-sensitive silver halide emulsion layer and a red-sensitive silver halide emulsion layer with the usual filter dyes or preferably with filter dyes which are destroyable by alkaline treating solution in or between the layers. The blue-sensitive layer comprises a dye-forming substance from which a yellow azo dye is obtainable by the process of the present invention. The green-sensitive emulsion layer may contain a dye-forming substance for the formation, by the same process, of a magenta dye, and a dye-forming substance for a blue-green dye is or may be present in the red-sensitive layer. The different steps of treating such a material are, for example, exposure in the camera, developing in alkaline developer, diazotizing, alkaline treatment and dye destruction at the image parts, with subsequent removal of the silver. A positive dye-image is obtained.

Azo dye components containing a diazo group or a group capable of being converted into a diazo group and further containing a coupling group capable of coupling with a diazo group are, for example, the condensation products obtainable according to Friedlaender "Fortschritte der Teerfarbenfabrikation," vol. X, page 193, from nitrobenzoyl halides and amino-benzoyl-2-amino-5-naphthol-7-sulphonic acid, or the reduction products of these compounds; the condensation products obtainable according to Friedlaender, l. c., vol. XI, pages 224 and 225; the compound

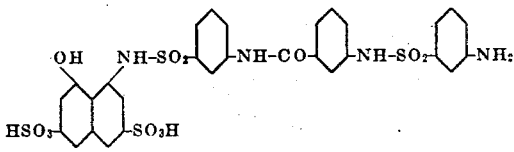

which is obtainable from 1-amino-8-hydroxynaphthalene-3.6-disulphonic acid by condensing with m-nitrobenzenesulphochloride, reduction of the condensation product, further condensing with m-nitro-benzoyl-chloride, reduction of the condensation product obtained, further condensing with m-nitrobenzenesulphonic chloride and reduction. This compound yields a magenta dye on diazotization and coupling with itself.

The dye components can be fixed within the photographic material by the known methods, for example, by forming an insoluble compound within the layer with the aid of precipitants, e. g., according to my British Patents Nos. 516,883 and 520,573. With many of the above cited substances, fixing is unnecessary, as the compounds have only a negligible tendency to diffuse.

The photographic material according to the present invention is especially useful for the manufacture of multi-color images. In the multi-layer material used for this process some or all of the layers may be layers according to the present invention. The layers according to the present invention may be combined with layers containing dyes or dye-forming substances or with light-sensitive layers not containing dyes or dye components.

I claim:

1. A photographic material comprising a support and a colloid layer on said support containing a dye-forming substance comprising

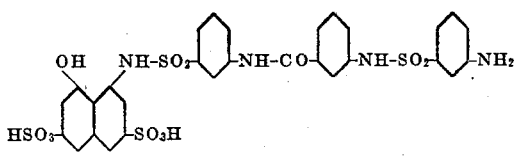

2. In a process for producing colored photographic materials from layers having a dye-forming substance comprising a derivative product of the condensation of nitrobenzoyl halides and aminobenzoyl - 2 - amino-5-naphthol-7-sulphonic acid, the steps of diazotizing said substance and converting the product of diazotization into a dye by coupling with itself.

3. In a process for producing colored photographic materials from layers having a dye-forming substance comprising

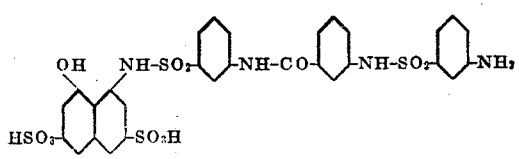

the steps of diazotizing said substance and converting the product of diazotization into a dye by coupling with itself.

4. A photographic layer adapted to have a coloring substance formed therein comprising a light-sensitive silver halide and a dye-forming substance containing a group selected from the group consisting of diazo, amino, nitro and nitroso and a coupling group capable of being coupled with a diazo group to form an azo dye but incapable of coupling with the oxidation products of a photographic developer.

5. A multi-layer photographic material for color photographic purposes having a layer adapted to have a coloring substance formed therein comprising a light-sensitive silver halide and a dye-forming substance containing a diazo group or a group capable of being converted into a diazo group by reactions which are compatible with the treatment of photographic materials and a coupling group capable of coupling with a diazo group to form an azo dye but incapable of coupling with the oxidation products of a photographic developer.

6. A photographic material comprising a support and a colloid layer on said support containing a dye-forming substance comprising a derivative product of the condensation of nitrobenzoyl halides and aminobenzoyl-2-amino-5-naphthol-7- sulphonic acid.

7. In a process for producing a colored image in a photographic layer comprising a light-sensitive silver halide and a dye-forming substance containing a diazo group or a group capable of being converted into a diazo group by reactions which are compatible with the treatment of photographic materials and a coupling group capable of coupling with a diazo group to form an azo dye, the steps of exposing said layer to light to form a latent image, treating said layer to form a silver image and to cause said dye-forming substance to combine with itself to form an azo dye diffusely throughout said layer and further treating said diffusely dyed layer to locally destroy the dye at the image or non-image parts of the layer.

8. In a process for producing a colored image in a photographic layer comprising a light-sensitive silver halide and a dye-forming substance containing a diazo group and a coupling group capable of coupling with a diazo group to form an azo dye, the steps of exposing said layer to light to form a latent image, treating said layer with an alkaline developing solution to form a silver image and to cause said dye-forming substance to combine with itself to form an azo dye diffusely throughout said layer, and treating said diffusely dyed layer to locally destroy the dye at the image or non-image parts of the layer.

9. In a process for producing a colored image in a photographic layer comprising a light-sensitive silver halide and a dye-forming substance containing a group capable of being formed into a diazo group and a coupling group capable of coupling with a diazo group, the steps of exposing said layer to light to form a latent image, developing said silver image, treating said layer to form a diazo group in said dye-forming substance, treating said layer to cause the converted dye-forming substance to combine with itself to form an azo dye diffusely throughout said layer, and treating said diffusely dyed layer to locally destroy the dye at the image or non-image parts of the layer.

10. A photographic material comprising a light-sensitive silver halide and a dye-forming substance containing an acyl amino naphthol compound, the acyl radical including a group selected from the group consisting of diazo, amino, nitro and nitroso and the naphthol radical having a coupling group capable of being coupled with a diazo group to form an azo dye but incapable of coupling with the oxidation products of a photographic developer.

11. A photographic material comprising a light-sensitive silver halide and a dye-forming substance containing a diazo group or a group capable of being converted into a diazo group by reactions which are compatible with the treatment of photographic materials and a coupling group capable of coupling with a diazo group to form an azo dye but incapable of coupling with the oxidation products of a photographic developer.

12. A photographic material comprising a light-sensitive silver halide and a dye-forming substance containing a group selected from the group consisting of diazo, amino, nitro and nitroso and a coupling group capable of coupling with a diazo group to form an azo dye but incapable of coupling with the oxidation products of a photographic developer.

13. In a process for producing colored images in a photographic material comprising at least two light-sensitive silver halide layers each of which contains a different dye-forming substance having a diazo group or a group capable of being converted into a diazo group by reactions which are compatible with the treatment of photographic materials and a coupling group capable of coupling with a diazo group to form an azo dye, the steps of exposing said layers to light to form latent images therein, treating said layers to form silver images and to cause each of said dye-forming substances to combine with itself to form an azo dye diffusely throughout each of said layers and further treating said diffusely dyed layers to locally destroy the dye at the image or non-image parts of each of said layers.

BÉLA GÁSPÁR.